(12) United States Patent
Lee et al.

(10) Patent No.: US 10,228,789 B2
(45) Date of Patent: Mar. 12, 2019

(54) CONDUCTIVE FILM, METHOD FOR MANUFACTURING SAME, TOUCH PANEL COMPRISING CONDUCTIVE FILM, AND DISPLAY DEVICE

(71) Applicant: LG ELECTRONICS INC., Seoul (KR)

(72) Inventors: Jihyun Lee, Seoul (KR); Jonggoo Park, Seoul (KR); Jaemin Lyu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 2 days.

(21) Appl. No.: 15/518,173

(22) PCT Filed: Oct. 5, 2015

(86) PCT No.: PCT/KR2015/010477
§ 371 (c)(1),
(2) Date: Apr. 10, 2017

(87) PCT Pub. No.: WO2016/056798
PCT Pub. Date: Apr. 14, 2016

(65) Prior Publication Data
US 2017/0351363 A1     Dec. 7, 2017

(30) Foreign Application Priority Data
Oct. 10, 2014  (KR) ........................ 10-2014-0136766

(51) Int. Cl.
*G06F 3/041*   (2006.01)
*G06F 3/045*   (2006.01)
*C08J 7/04*    (2006.01)

(52) U.S. Cl.
CPC ............. *G06F 3/0412* (2013.01); *C08J 7/04* (2013.01); *G06F 3/045* (2013.01); *G06F 3/0416* (2013.01);
(Continued)

(58) Field of Classification Search
CPC ..... G06F 3/0412; G06F 3/044; H05K 1/0296; H05K 3/02; H05K 3/10; H01B 5/14
See application file for complete search history.

(56) References Cited

U.S. PATENT DOCUMENTS 9,052,587 B2 * 6/2015 Yamazaki ............... H05K 3/06
2008/0138589 A1 * 6/2008 Wakabayashi ......... H01H 13/83
                                                         428/195.1
(Continued)

FOREIGN PATENT DOCUMENTS

KR   10-2012-0040032 A   4/2012
KR   10-2013-0109287 A   10/2013
(Continued)

*Primary Examiner* — Sardis F Azongha
(74) *Attorney, Agent, or Firm* — Birch, Stewart, Kolasch & Birch, LLP

(57) ABSTRACT

A conductive film for a touch panel used for a touch panel and including, a base member comprising a concave portion or a protruding portion and having a stepped portion having a pattern corresponding to a pattern for touch sensing in an effective area; and a sensor electrode comprising a sensor electrode portion formed over the stepped portion in the effective area so as to correspond to the same.

17 Claims, 11 Drawing Sheets

(52) U.S. Cl.
CPC .............. *G06F 2203/04102* (2013.01); *G06F 2203/04103* (2013.01)

(56) References Cited

U.S. PATENT DOCUMENTS

| | | | |
|---|---|---|---|
| 2013/0056342 A1* | 3/2013 | Wang | G06F 3/044 200/600 |
| 2013/0328575 A1 | 12/2013 | Ra et al. | |
| 2014/0055405 A1* | 2/2014 | Ma | G06F 3/041 345/174 |
| 2014/0125630 A1* | 5/2014 | Wang | G06F 3/044 345/174 |
| 2016/0252989 A1* | 9/2016 | Zhang | G06F 3/041 345/173 |
| 2016/0282982 A1* | 9/2016 | Hwang | G06F 3/044 |

FOREIGN PATENT DOCUMENTS

| | | |
|---|---|---|
| KR | 10-2014-0100090 A | 8/2014 |
| KR | 10-2014-0116034 A | 10/2014 |

\* cited by examiner

CONDUCTIVE FILM, METHOD FOR MANUFACTURING SAME, TOUCH PANEL COMPRISING CONDUCTIVE FILM, AND DISPLAY DEVICE

CROSS REFERENCE TO RELATED APPLICATIONS

This application is the National Phase of PCT International Application No. PCT/KR2015/010477, filed on Oct. 5, 2015, which claims priority under 35 U.S.C. 119(a) to Patent Application No. 10-2014-0136766, filed in the Republic of Korea on Oct. 10, 2014, all of which are hereby expressly incorporated by reference into the present application.

TECHNICAL FIELD

The present invention relates to a conductive film, a method of manufacturing the conductive film, and a touch panel and a display device including the conductive film.

BACKGROUND ART

In recent years, a conductive film including a transparent conductive thin film has been variously applied to various kinds of electronic devices, such as a display panel and a touch panel. The conductive film is formed by forming a transparent conductive thin film having low resistance on a plastic substrate and patterning the transparent conductive thin film.

In general, such a transparent conductive thin film is formed by vacuum-depositing a specific material, such as indium tin oxide. However, indium tin oxide is expensive, and productivity in vacuum-depositing the indium tin oxide is low. Furthermore, indium tin oxide is not flexible, whereby it is difficult to apply the indium tin oxide to flexible electronic devices. In addition, the indium tin oxide has high resistance, with the result that it is difficult to apply the indium tin oxide to large-sized electronic devices.

SUMMARY

It is an object of the present invention to provide a conductive film that exhibits excellent properties, is manufactured through a simple process, and is applicable to a touch panel, a method of manufacturing the conductive film, and a touch panel and a display device including the conductive film.

In accordance with one aspect of the present invention, the above and other objects can be accomplished by the provision of a conductive film for a touch panel including a base member, including a stepped part configured as a concave portion or a protruding portion and having a pattern corresponding to a pattern for touch sensing in an active area, and a sensor electrode, including a sensor electrode part formed on the stepped part so as to correspond to the stepped part in the active area.

In accordance with another aspect of the present invention, there is provided a touch panel including the conductive film and another sensor electrode formed in the direction in which the another sensor electrode intersects the sensor electrode of the conductive film while being spaced apart from the sensor electrode of the conductive film.

In accordance with another aspect of the present invention, there is provided a display device including the touch panel and a display panel located behind the touch panel for displaying images.

In accordance with a further aspect of the present invention, there is provided a method of manufacturing a conductive film for a touch panel, the method including forming a coating layer made of a conductive material over the entirety of a base member including a stepped part configured as a concave portion or a protruding portion and having a pattern corresponding to a pattern for touch sensing in an active area and forming a sensor electrode part located on the stepped part by drying the coating layer so as to be spaced apart from the remaining portion in the active area to form a sensor electrode.

ADVANTAGEOUS EFFECTS

In a touch panel and a display device according to embodiments of the present invention or a conductive film used therein, a sensor electrode includes conductors made of a nano-material forming a network structure, thereby improving various properties. In addition, the sensor electrode is covered by an over-coating layer to prevent physical damage to or oxidization of the sensor electrode, thereby improving the properties of the sensor electrode. Furthermore, the sensor electrode is formed so as to have a desired shape through a stepped part without an additional patterning process, thereby simplifying the manufacturing process and thus greatly improving productivity.

DETAILED DESCRIPTION OF THE EMBODIMENTS

Figure 1:
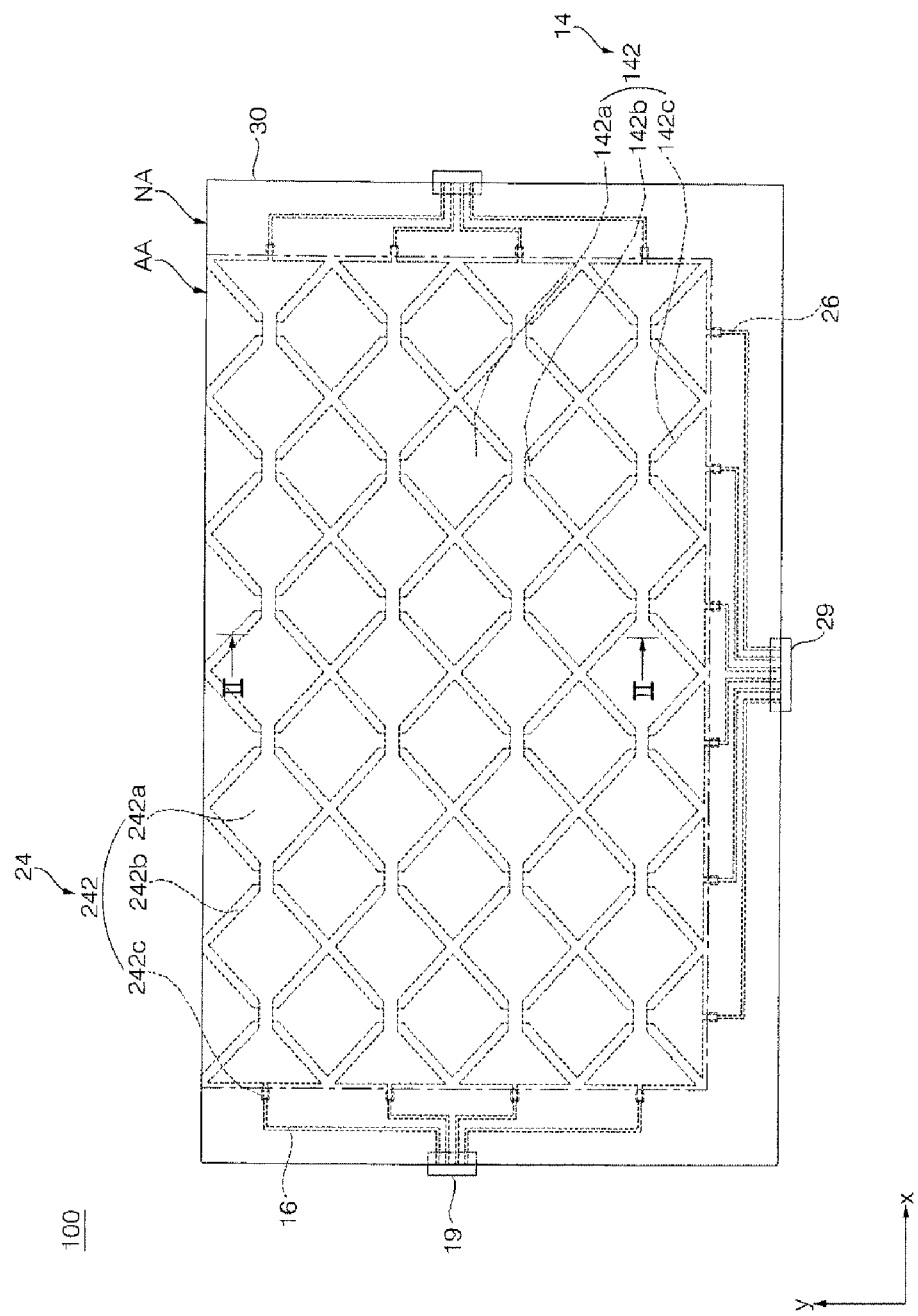
FIG. 1 is a plan view schematically showing a touch panel according to an embodiment of the present invention.

Reference will now be made in detail to the preferred embodiments of the present invention, examples of which are illustrated in the accompanying drawings. However, it will be understood that the present invention should not be limited to the embodiments and may be modified in various ways.

In the drawings, to clearly and briefly explain the present invention, illustration of elements having no connection with the description is omitted, and the same or extremely similar elements are designated by the same reference numerals throughout the specification. In addition, in the drawings, for more clear explanation, the dimensions of elements, such as thickness, width, and the like, are exaggerated or reduced, and thus the thickness, width, and the like of the present invention are not limited to what is illustrated in the drawings.

Throughout the specification, when an element is referred to as "including" another element, the element should not be understood as excluding other elements so long as there is no special conflicting description, and the element may include at least one other element. In addition, it will be understood that, when an element such as a layer, film, region or substrate is referred to as being "on" another element, it can be directly on the other element, or intervening elements may also be present. On the other hand, when an element such as a layer, film, region or substrate is referred to as being "directly on" another element, this means that there are no intervening elements therebetween.

Hereinafter, a touch panel according to an embodiment of the present invention, a method of manufacturing the touch panel, a conductive film included in the touch panel, and a method of manufacturing the conductive film will be described in detail with reference to the accompanying drawings. In addition, a display device including the touch panel according to the embodiment of the present invention will be described in detail.

Figure 2:
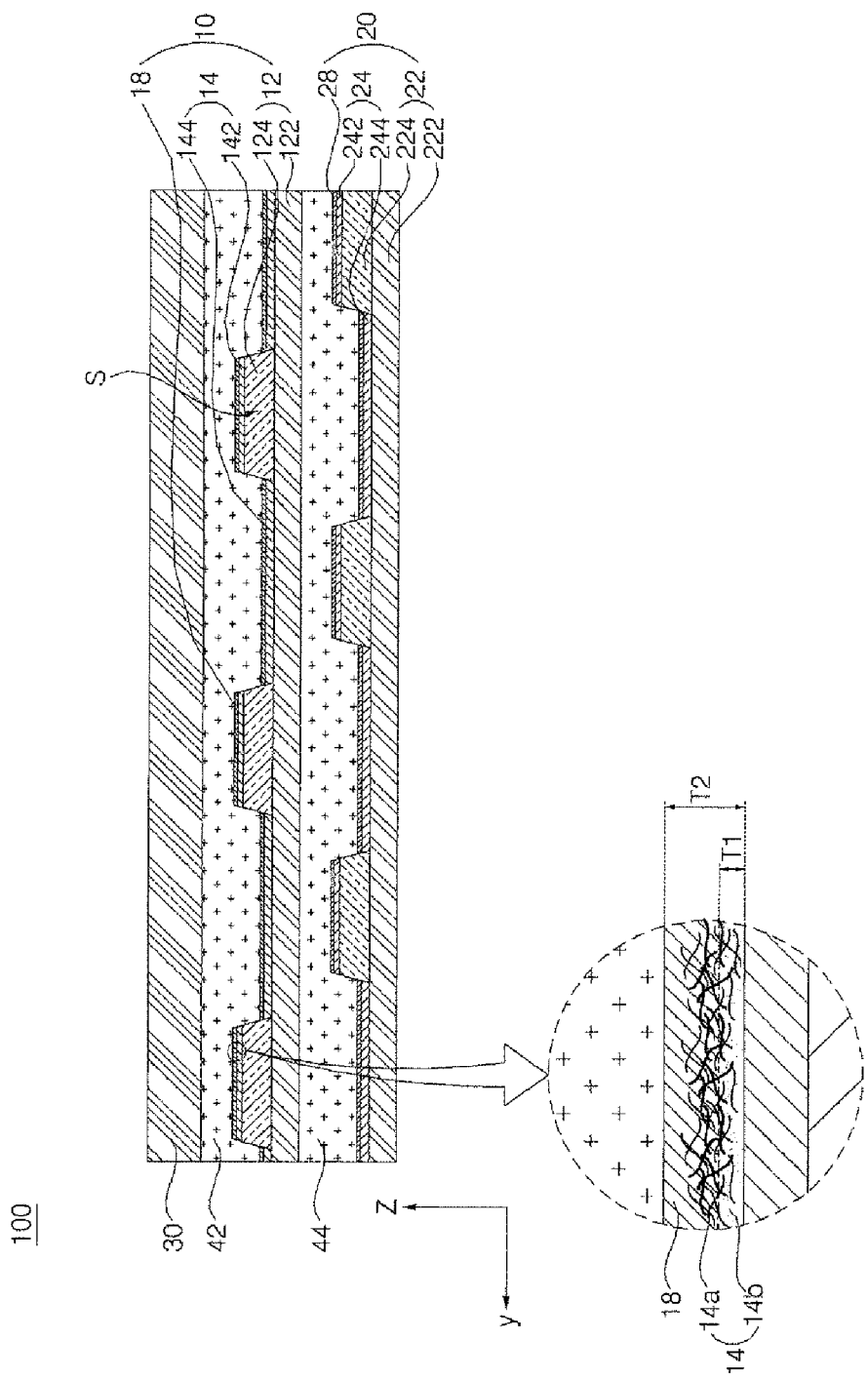
FIG. 2 is a sectional view taken along line II-II of FIG. 1.

FIG. 1 is a plan view schematically showing a touch panel according to an embodiment of the present invention, and FIG. 2 is a sectional view taken along line II-II of FIG. 1. For a clearer and simpler illustration, first and second transparent adhesive layers 42 and 44, first and second base members 12 and 22, first and second over-coating layers 18 and 28, and auxiliary electrode parts 144 and 244 of first and second sensor electrodes 14 and 24 are omitted from FIG. 1 such that sensor electrode parts 142 and 242 of the first and second sensor electrodes 14 and 24 and first and second wire electrodes 16 and 26 are mainly shown.

As shown in FIGS. 1 and 2, a touch panel 100 according to this embodiment may include an active area AA and a non-active area NA located outside the active area AA. The active area AA is an area in which sensor electrodes 14 and 24 are located to sense the touch of an input device, such as a user's hand or a stylus pen. The non-active area NA is an area in which external circuits, such as flexible printed circuit boards (FPCBs) 19 and 29 connected to a touch control unit (not shown) of the display device for controlling the touch panel 100, and wire electrodes 16 and 26 connected thereto are located to transmit information sensed in the active area AA. In addition, a bezel (not shown) for physically fixing various layers and parts constituting the touch panel 100 and covering various parts located in the non-active area NA or a black printed layer (not shown) may be located in the non-active area NA. In this embodiment, the non-active area NA is formed along the outer edge of the active area AA. However, the present invention is not limited thereto, and various changes are possible. For example, when viewed from the front or above, the non-active area NA may not be visible.

The touch panel 100 according to this embodiment includes a first conductive film 10 including a first sensor electrode 14 (and additionally, a first wire electrode 16) and a second sensor electrode 24 (and additionally, a second wire electrode 26) located so as to be isolated from the first sensor electrode 14. In this embodiment, the second sensor electrode 24 and the second wire electrode 26 may be located on a second base member 22 to constitute a second conductive film 20.

The touch panel 100 may further include a cover substrate 30, a first transparent adhesive layer 42 for bonding the cover substrate 30 and the first conductive film 10, and a second transparent adhesive layer 44 for bonding the first conductive film 10 and the second conductive film 20, which will be described in more detail.

The cover substrate 30 may be made of a material for allowing light to pass through the touch panel 100 while protecting the touch panel 100 from external impact. In one example, the cover substrate 30 may include glass. However, the present invention is not limited thereto. The cover substrate 30 may be made of various materials.

The first transparent adhesive layer 42 is located between the cover substrate 30 and the first conductive film 10 to bond them, and the second transparent adhesive layer 44 is located between the first conductive film 10 and the second conductive film 20 to bond them. A plurality of layers constituting the touch panel 100 may be integrally coupled using the first and second transparent adhesive layers 42 and 44. The first and second conductive films 10 and 20 may be bonded to the first and/or second transparent adhesive layer 42 and/or 44 in the state in which first and second flexible printed circuit boards 19 and 29 are attached thereto.

Each of the first and second transparent adhesive layers 42 and 44 may be made of a material having adhesiveness capable of bonding layers located at opposite sides thereof and transparency, i.e. an optically clear adhesive (OCA). The optically clear adhesive exhibits high adhesive force, prevents deterioration of the first and/or second sensor electrode 14 and/or 24 and the first and/or second wire electrode 16 and/or 26, and exhibits high moisture resistance, heat resistance, foamability, and processability. The first and second transparent adhesive layers 42 and 44 may be made of various kinds of optically clear adhesives.

The first and second conductive films 10 and 20 are located on the cover substrate 30 (on the lower surface of the cover substrate 30 in the figure). In this embodiment, the first sensor electrode 14 is formed on the first base member 12 to constitute the first conductive film 10, and the second sensor electrode 24 is formed on the second base member 22 to constitute the second conductive film 20. However, the present invention is not limited thereto, and various changes are possible, which will be described in more detail with reference to FIGS. 8 to 10.

The first conductive film 10 includes a first base member 12, a first sensor electrode 14 formed on the first base member 12, a first over-coating layer 18 for covering the first sensor electrode 14, and a first wire electrode 16 electrically connected to the first sensor electrode 14 in the non-active area NA.

The first base member 12 may include a stepped part S configured as a concave portion or a protruding portion and having a pattern corresponding to a pattern for touch sensing in the active area AA. In the figure and the description, the stepped part S, on which the first sensor electrode part 142 is located, is configured as a protruding portion. Alternatively, the stepped part S may be configured as a concave portion.

The first sensor electrode 14 may include a first sensor electrode part 142 formed on the stepped part S so as to correspond to the stepped part S in the active area AA. A first auxiliary electrode part 144 (see FIG. 3; the same in the following) stepped from the first sensor electrode 14 and partially connected (electrically and physically connected) to the first sensor electrode part 142 may be located at a portion other than the stepped part S in the active area AA. The first sensor electrode part 142 and the first auxiliary electrode part 144 will be described in more detail with reference to FIGS. 3 to 5 together with FIGS. 1 and 2.

In this embodiment, the stepped part S has a shape corresponding to the first sensor electrode part 142 in the active area AA. However, the present invention is not limited thereto. The stepped part S may be formed in the non-active area NA while having a wire pattern, and the first wire electrode 16 may be located on the stepped part S formed in the non-active area NA, which will be described in more detail with reference to FIG. 7.

The first base member 12 may be made of a material exhibiting transparency and insulability while maintaining the mechanical strength of the first conductive film 10. The first base member 12 may have a stepped part S formed so as to correspond to a pattern for touch sensing. In one example, the first base member 12 may include a film portion 122 formed over the entire area of the first conductive film 10 while having a uniform thickness and a protruding portion 124 forming a stepped part S on the film portion 122.

In this embodiment, the stepped part S is formed by the protruding portion 124, which is configured as a layer separated from the film portion 122. Consequently, it is possible to form a first base member 12 having a stepped part S by forming the protruding portion 124 on various kinds of existing films or sheets. In addition, it is possible to easily form a stepped part S having a desired pattern.

However, the present invention is not limited thereto. The film portion 122 and the protruding portion 124 may be made of the same material so as to be configured as a single layer. At this time, the remaining portion excluding the portion corresponding to the stepped part S may be removed such that the stepped part S is configured as a protruding portion 124. Alternatively, the portion corresponding to the stepped part S may be removed such that the stepped part S is configured as a concave portion, rather than the protruding portion 124. Additionally, in this embodiment, the protruding portion 124 is formed on only the portion corresponding to the stepped part S such that the film portion 122 is exposed between the stepped parts S. Alternatively, the protruding portion 124 may be located over the entire film portion 122 so as to protrude or to be concave. Various other changes are possible.

The film portion 122 may be a film, sheet, or substrate made of a material exhibiting transparency and insulability while maintaining the mechanical strength of the first conductive film 10. The film portion 122 may include at least one selected from among polyethylene, polypropylene, polyethylene terephthalate, polyethylene-2,6-naphthalate, polypropylene terephthalate, polyimide, polyamide imide, polyethersulfone, polyether ether ketone, polycarbonate, polyarylate, cellulose propionate, polyvinyl chloride, polyvinylidene chloride, polyvinyl alcohol, polyether imide, polyphenylene sulfide, polyphenylene oxide, and polystyrene. In one example, the film portion 122 may be made of polyethylene terephthalate. However, the present invention is not limited thereto. The film portion 122 may be made of various other materials.

The protruding portion 124 may be formed by coating and patterning a resin layer including various resins. Various UV-curable or thermosetting resins may be used. In one example, acryl resin may be used.

The stepped part S is provided to form a first sensor electrode part 142 having a pattern for touch sensing without additional patterning. For example, when an electrode layer is formed over the entirety of the first base member 12 having the stepped part S, a first sensor electrode part 142 having a pattern corresponding to the stepped part S is formed on the stepped part S, and a first auxiliary electrode part 144 stepped from the first sensor electrode part 142 is formed at the portion at which the stepped part S is not located. Since the first sensor electrode 14 includes a first sensor electrode part 142 formed by the stepped part S without patterning, as described above, it is possible to simplify the process of manufacturing a first conductive film 10 including a first sensor electrode part 142 having a pattern.

As described above, the first sensor electrode 14 located on the first base member 12 and/or the stepped part S may include a first sensor electrode part 142 located on the stepped part S in the active area AA. The first sensor electrode part 142 may include first sensor parts 142a located in the active area AA and first connection parts 142b for interconnecting neighboring first sensor parts 142a. In addition, the first sensor electrode part 142 may include first wire connection parts 142c extending from the first sensor parts 142a or the first connection parts 142b in the active area AA and located in the non-active area NA. In this embodiment, the first sensor electrode 14 and the first wire electrode 16 are configured as separate layers. However, the present invention is not limited thereto. The first sensor electrode 14 and the first wire electrode 16 may be integrally formed.

The first sensor parts 142a are portions for substantially sensing whether an input device, such as a finger, has contacted the touch panel. In the figure, each of the first sensor parts 142a is diamond-shaped, and the first sensor parts 142a are formed over a large area in the active area AA together with second sensor parts 242a of the second sensor electrode 24 so as to effectively perform touch sensing. However, the present invention is not limited thereto. Each of the first sensor parts 142a may have various shapes, such as a polygon, including a triangle and a quadrangle, a circle, and an oval. The first connection parts 142b interconnect the first sensor parts 142a in a first direction (the horizontal direction in the figure). As a result, the first sensor electrode 14 may extend in the first direction in the active area AA.

The first wire connection parts 142c include portions extending from the first sensor parts 142a r the first connection parts 142b into the non-active area NA so as to be directly or electrically connected to the first wire electrode 16. In this embodiment, the first wire connection parts 142c may serve to interconnect the first sensor electrode part 142 and the first auxiliary electrode part 144. The first wire connection parts 142c may have various shapes that can be stably connected to the first wire electrode 16. However, the present invention is not limited thereto.

In this embodiment, the first auxiliary electrode part 144 of the first sensor electrode 14 may be located at the portion at which the stepped part S is not formed (e.g. at the concave portion).

In this embodiment, the first sensor electrode 14 includes a transparent conductive material exhibiting conductivity and transparency. In one example, the first sensor electrode 14 may include conductors 14a made of a nano-material having a network structure (e.g. a metal nano wire, such as a silver nano wire, a copper nano wire, and a platinum nano wire). Here, the network structure is a structure in which conductors made of a nano-material, such as a wire, are twisted with neighboring conductors made of a nano-material while having contact points to form a net structure or a mesh structure such that electrical connection therebetween is achieved through the contact points.

In the case in which the first sensor electrode 14 includes conductors 14a made of a nano-material exhibiting transparency and conductivity, the first sensor electrode 14 may be formed using a wet coating method, which is less expensive than a deposition method. That is, the first sensor electrode 14 may be formed by forming an electrode layer using a wet coating method of coating paste, ink, a mixture, or a solution including conductors made of a nano-material, such as a nano wire, and patterning the electrode layer. The concentration of the conductors 14a made of the nano-material in the solution, mixture, or paste used in the wet coating method is very low (e.g. 1% or less). Consequently, the cost required to form the first sensor electrode 14 is reduced, thereby improving productivity.

In the case in which the first sensor electrode 14 includes conductors 14a made of a nano-material, the first sensor electrode 14 exhibits low resistance, excellent electrical properties, and light transparency. In one example, the surface of a silver (Ag) nano particle has various crystal planes, whereby anisotropic growth may be easily induced. Consequently, it is possible to easily manufacture a silver nano wire. The silver nano wire has a resistance of about 10Ω/□ to 400Ω/□, whereby low resistance (e.g. 10Ω/□ to 150Ω/□) may be realized. Consequently, it is possible to form a first sensor electrode 14 having various resistances. In particular, it is possible to form a first sensor electrode 14 exhibiting higher electrical conductivity than indium tin oxide, which has a resistance of about 200Ω/□ to 400Ω/□. The silver nano wire exhibits higher transmittance than indium tin oxide. In one example, the silver nano wire may have a transmittance of 90% or higher. In addition, the silver nano wire is flexible. Consequently, the silver nano wire may be applied to flexible devices and may be reliably obtained.

In one example, the nano wire (in particular, a silver nano wire) may have a radius of 10 nm to 60 nm and a major axis of 10 um to 200 um (in one example, 30 um to 200 um). The nano wire has a desirable aspect ratio (e.g. 1:300 to 1:20000) within the above range such that the network structure is easily formed and the first sensor electrode 14 is invisible. However, the present invention is not limited thereto. The radius, major axis, and aspect ratio of the nano wire may have various values.

In this embodiment, the first sensor electrode 14 includes conductors 14a made of a nano-material forming a network structure, thereby reducing material costs and improving various properties.

In the first sensor electrode 14, which includes a conductive layer including conductors 14a made of a nano-material forming a network structure, the conductors 14a made of the nano-material may be located in a layer having a uniform thickness, or empty space may be formed between the conductors 14a made of the nano-material. Actually, the first sensor electrode 14 is formed by applying conductors 14a made of a nano-material mixed in a solvent or a binder. Subsequently, a portion of the solvent or the binder remains to form a residual portion 14b. In the first sensor electrode 14, therefore, the residual portion 14b, which is formed by the residual portion of the solvent or the binder, has a relatively small first thickness T1, and the conductors 14a extend to the outside of the residual portion 14b. Consequently, the network structure formed by the conductors 14a may have a relatively large second thickness T2. In the following description, the thickness of the first sensor electrode 14 is the total thickness of the layer at which the residual portion 14b and the conductors 14a protruding upward from the residual portion 14b are located, i.e. the second thickness T2, rather than the first thickness T1, which is the thickness of the residual portion 14b.

The thickness of the first sensor electrode 14 may be variously changed depending on the size of the touch panel 100, the resistance value that is required, and the material of the first sensor electrode 14. In the case in which the first sensor electrode 14 includes a metal nano wire having a network structure, it is possible to minimize the thickness of the first sensor electrode 14. In this embodiment, the first sensor electrode part 142 and the first auxiliary electrode part 144 may have different thicknesses, which will be described in more detail later.

The first over-coating layer 18, which covers the first sensor electrode 14 on the first base member 12, physically and chemically protects the first sensor electrode 14. Specifically, the first over-coating layer 18 may entirely cover the conductors 14a extending to the outside of the residual portion 14b while wrapping the outer surfaces of the conductors 14a to prevent damage to the conductors 14a or oxidation of the conductors 14a. More specifically, the first over-coating layer 18 may prevent the conductors 14a exposed above the residual portion 14b from being bent by external force. That is, the first over-coating layer 18 may prevent physical damage to the conductors 14a. In addition, since the conductors 14a are oxidized when exposed to external air for a long time, whereby the electrical conductivity thereof is reduced, the first over-coating layer 18 may be formed so as to cover the conductors 14a (e.g. so as to cover the conductors 14a while being in contact with the conductors 14a) in order to prevent the above problems.

In this embodiment, since the first sensor electrode 14 includes conductors 14a made of a nano-material constituting a network structure, the first over-coating layer 18 is formed to improve the physical stability of the conductors 14a and to prevent oxidization of the conductors 14a. In one example, a portion of the first over-coating layer 18 may be impregnated into the space between the conductors 14a to fill the space between the conductors 14a, and another portion of the first over-coating layer 18 may be formed on the conductors 14a. Even in the case in which the conductors 14a do not protrude above the residual portion 14b but are located in the residual portion 14b, unlike this embodiment, the first over-coating layer 18 may prevent the conductors 14a from being oxidized by air permeating into the residual portion 14b. To this end, the first over-coating layer 18 may be formed so as to directly contact the first sensor electrode 14 or the conductors 14a.

The first over-coating layer 18 may be entirely formed on the first base member 12 while covering the first sensor electrode 14. Here, the expression "first over-coating layer 18 is entirely formed" includes the case in which a portion of the first over-coating layer 18 is inevitably not formed as well as the case in which the first over-coating layer 18 is completely formed without any gap.

The first over-coating layer 18 may be made of a resin. In one example, the first over-coating layer 18 may be made of an acrylic resin. However, the present invention is not limited thereto. The first over-coating layer 18 may include other materials. In addition, the first over-coating layer 18 may be formed so as to entirely cover the first sensor electrode 14 using various coating methods.

In the figure, the first over-coating layer 18 has a flat surface while having a thickness sufficient to entirely cover the conductors 14a. Alternatively, the first over-coating layer 18 may have a small thickness while wrapping the conductors 14a so as to cover the protruding surfaces of the conductors 14*a*, whereby the first over-coating layer 18 may have a curved surface corresponding to the surfaces of the conductors 14*a*.

In one example, the first over-coating layer 18 may have a thickness of 1 nm to 10 nm. If the thickness of the first over-coating layer 18 is less than 1 nm, the effect of preventing oxidization of the conductors 14*a* is not sufficient. If the thickness of the first over-coating layer 18 is greater than 10 nm, material costs may be increased. However, the present invention is not limited thereto. The thickness of the first over-coating layer 18 may have various values.

In the figure and the above embodiment, the residual portion 14*b* of the first sensor electrode 14 and the first over-coating layer 18 are different layers. However, the present invention is not limited thereto. In another embodiment, ink in which materials constituting the conductors 14*a* and the residual portion 14*b* of the first sensor electrode 14 the first over-coating layer 18 are mixed may be applied such that the conductors 14*a* are located in the first over-coating layer 18 constituting a single layer. Various other changes are also possible.

In the non-active area NA, the first wire electrode 16, which is connected to the first wire connection parts 142*c*, is formed on the first over-coating layer 18. The first wire electrode 16 may extend while having a relatively small width so as to be connected to the first flexible printed circuit board 19.

The first wire electrode 16 and the first sensor electrode 14 may be electrically connected to each other as being stacked in the state in which the first over-coating layer 18 is disposed therebetween. Alternatively, all or a portion of the first over-coating layer 18 disposed between the first wire electrode 16 and the first sensor electrode 14 may be removed such that the first wire electrode 16 and the first sensor electrode 14 can contact each other so as to be electrically connected to each other. Various other changes are also possible.

The first wire electrode 16 may be made of a metal material exhibiting high conductivity. In this case, the resistance of the first wire electrode 16 is low even when the width of the first wire electrode 16 is small, whereby the first wire electrode 16 may have excellent electrical properties. The first wire electrode 16 may be formed using various methods. In one example, the first wire electrode 16 may be formed by applying conductive paste using various coating methods and hardening the conductive paste through heat treatment or plasticization. The first wire electrode 16 may be made of a metal material so as to have excellent electrical conductivity. For example, the first wire electrode 16 may be made of conductive paste including conductive powder, such as silver (Ag).

However, the present invention is not limited thereto. The first wire electrode 16 may include various shapes or various conductive materials. In this embodiment, the first sensor electrode 14 and the first wire electrode 16 are made of different materials. Alternatively, the first wire electrode 16 may be made of the same material as the first sensor electrode 14 such that the first wire electrode 16 and the first sensor electrode 14 have a single structure. In this case, the first wire electrode 16 may include conductors 14*a* made of the same nano-material as the first sensor electrode 14. As a result, it is possible to simplify the process of manufacturing the first sensor electrode 14 and the first wire electrode 16.

Additionally, in the figure, the first wire electrode 16 is connected to the outside via two non-active areas NA located at opposite sides of the active area AA. However, the present invention is not limited thereto. The first wire electrode 16 may be connected to the outside via one non-active area NA located at one side of the active area AA. Alternatively, the first wire electrode 16 may extend to the upper side or the lower side of the active area AA so as to be connected to the outside. Various other changes are also possible.

The first flexible printed circuit board 19 for connection with the outside may be connected to the first wire electrode 16. The first flexible printed circuit board 19 may include a base member and a wire part formed on the base member. The wire part of the first flexible printed circuit board 19 may contact the first wire electrode 16 such that the first wire electrode and the first flexible printed circuit board are electrically connected to each other. However, the present invention is not limited thereto. A conductive adhesive member (not shown), such as anisotropic conductive adhesive (ACA), anisotropic conductive paste (ACP), or anisotropic conductive film (ACF), may be located between the wire part of the first flexible printed circuit board 19 and the first wire electrode 16 so as to electrically interconnect them.

In the figure, the first wire electrode 16 is located at both ends of the first sensor electrode 14 so as to have a double routing structure. The reason for this is that, since the first sensor electrode 14 is relatively long, it is necessary to reduce the resistance of the first sensor electrode 14 so as to prevent loss due to the resistance. However, the present invention is not limited thereto. The first wire electrode 16 may be connected to only one side of the first sensor electrode 14 so as to have a single routing structure. Various other structures may also be formed.

Additionally, in the figure, the first wire electrode 16 is connected to the outside via two non-active areas NA located at opposite sides of the active area AA. However, the present invention is not limited thereto. The first wire electrode 16 may be connected to the outside via one non-active area NA located at one side of the active area AA. Alternatively, the first wire electrode 16 may extend to the upper side or the lower side of the active area AA so as to be connected to the outside. Various other changes are also possible.

Hereinafter, the stepped part S and the first sensor electrode 14 will be described in more detail with reference to FIGS. 3 to 5 together with FIGS. 1 and 2.

Figure 3:
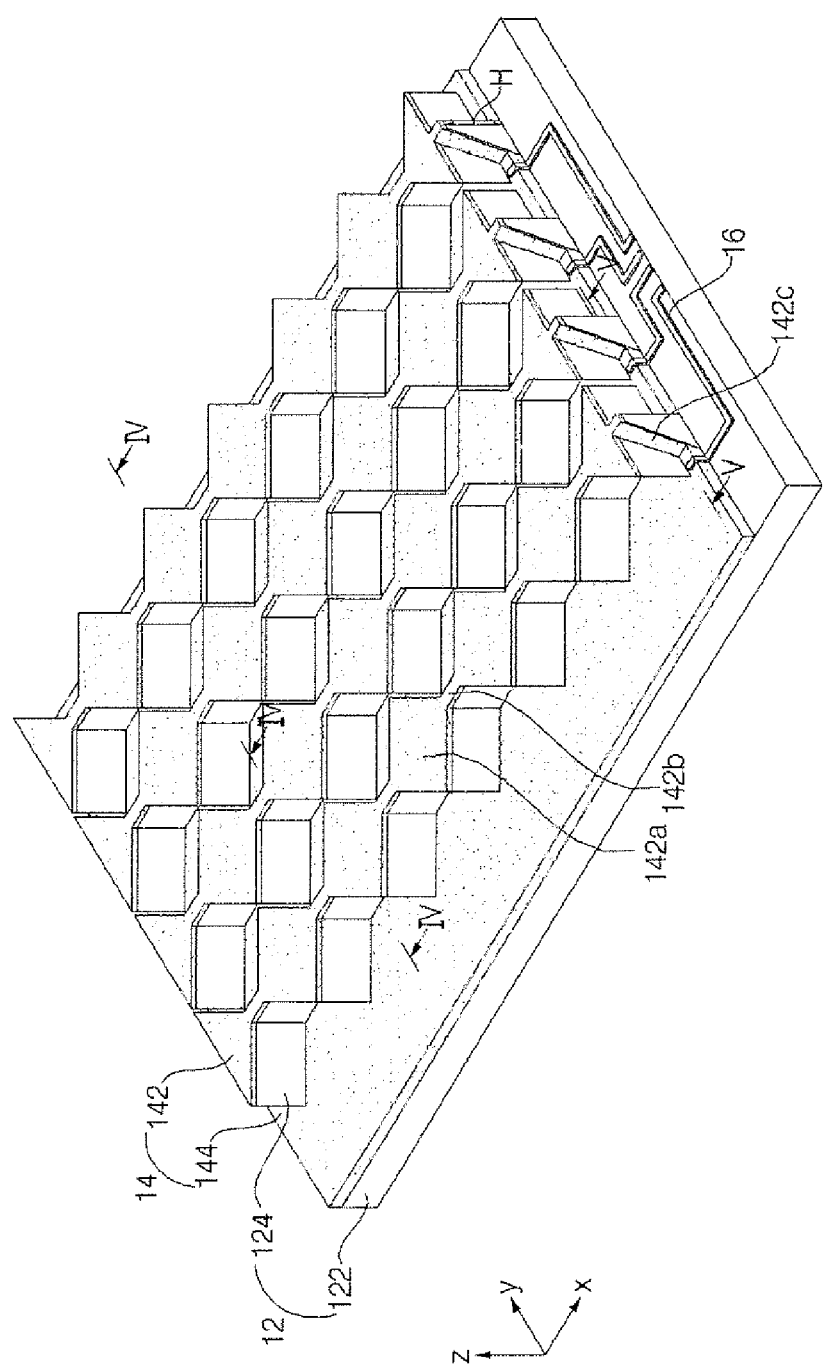
FIG. 3 is a perspective view showing a portion of a first conductive film that is applied to the touch panel shown in FIG. 1.

FIG. 3 is a perspective view showing a portion of the first conductive film that is applied to the touch panel shown in FIG. 1. FIG. 4 is a sectional view taken along line IV-IV of FIG. 3, and FIG. 5 is a sectional view taken along line V-V of FIG. 3. The first base member 12 including the stepped part S, the first sensor electrode 14, and the first wire electrode 16 are mainly shown in FIG. 3, and the first over-coating layer 18 is shown together with the first base member 12 and the first sensor electrode 14 in FIGS. 4 and 5.

Figure 4:
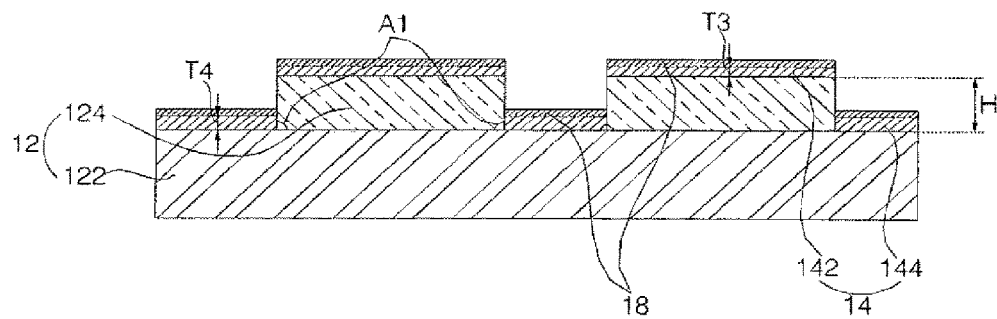
FIG. 4 is a sectional view taken along line IV-IV of FIG. 3.
Figure 5:
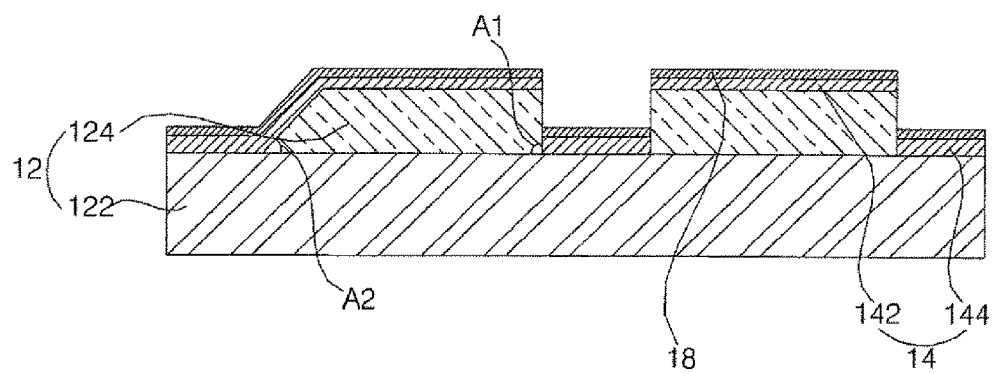
FIG. 5 is a sectional view taken along line V-V of FIG. 3.

Referring to FIGS. 3 to 5, as previously described, the first sensor electrode part 142 may be located on the protruding portion 124 constituting the stepped part S, and the first auxiliary electrode part 144 may be located on the film portion 122 so as to be stepped from the first sensor electrode 14 at the portion other than the stepped part S. In the active area AA, the first sensor electrode part 142 and the first auxiliary electrode part 144 may be spaced apart from each other in the height direction. In the non-active area NA, the first sensor electrode part 142 and the first auxiliary electrode part 144, which is located at one side of the first sensor electrode part 142, may be connected to each other.

In this embodiment, the height H of the stepped part S may be 30 um to 300 nm (in one example, 30 um to 100 um, preferably 50 um to 100 um). If the height H of the stepped part S is less than 30 um, the conductors 14a, made of the nano-material, of the first sensor electrode 14 are placed at the side surface of the stepped part, with the result that the first sensor electrode part 142 and the first auxiliary electrode part 144 may be electrically connected to each other, whereby it may be difficult for the first sensor electrode part 142 and the first auxiliary electrode part 144 to be effectively spaced apart from each other. If the height H of the stepped part S is greater than 300 um, it is necessary to thickly form paste, ink, a mixture, or a solution including conductors 14a made of a nano-material so as to cover the stepped part S at the time of forming the first sensor electrode 14, which leads to an increase in processing time and costs. In the case in which the height H of the stepped part S is 50 um or higher, the first sensor electrode part 142 and the first auxiliary electrode part 144 may be effectively spaced apart from each other. In the case in which the height H of the stepped part S is 100 um or lower, it is possible to reduce the thickness of the paste, the ink, the mixture, or the solution including the conductors 14a made of the nano-material. However, the present invention is not limited thereto. The height H of the stepped part S may have various values.

In the active area AA, a first angle A1 formed by the opposite side surfaces of the stepped part S and the bottom surface of the stepped part S may be 80 to 110 degrees. If the first angle A1 is less than 80 degrees, the gradient of the side surfaces of the stepped part S is small, with the result that the first sensor electrode part 142 and the first auxiliary electrode part 144 may not be effectively spaced apart from each other. If the first angle A1 is greater than 110 degrees, it may be difficult to form the stepped part S. In the case in which the first angle A1 is greater than 90 degrees and is equal to or less than 110 degrees (i.e. the first angle is an obtuse angle), the area of the upper surface of the stepped part S becomes greater than that of the bottom surface of the stepped part S, with the result that the first sensor electrode part 142 and the first auxiliary electrode part 144 may be effectively spaced apart from each other. However, the present invention is not limited thereto. The first angle A1 may have various values.

Meanwhile, in the non-active area NA, a second angle A2 formed by one side surface of the stepped part S and the bottom surface of the stepped part S may be 45 degrees or lower (in one example, 10 to 45 degrees). That is, the second angle A2, which is an angle of inclination at one side surface of the stepped part S in the non-active area NA, may be less than the first angle A1, which is an angle of inclination at the side surface of the stepped part S in the active area AA. In this case, the first sensor electrode part 142 and the first auxiliary electrode part 144 located on the stepped part S may not be completely disconnected from each other but may be connected to each other along one side surface of the stepped part S having the second angle A2, which is a small angle of inclination. If the second angle A2 is greater than 45 degrees, it may be difficult to interconnect the first sensor electrode part 142 and the first auxiliary electrode part 144. If the second angle A2 is less than 10 degrees, the length of one side surface at which the first sensor electrode part 142 and the first auxiliary electrode part 144 are connected to each other may be increased.

On the other hand, in the non-active area NA, the other side surface of the stepped part S has the first angle A1, with the result that the first sensor electrode part 142 is not connected to the first auxiliary electrode part 144 located at the other side.

In the active area AA, therefore, the first sensor electrode part 142 may be spaced apart from the first auxiliary electrode part 144. Additionally, in the non-active area NA, the first sensor electrode part 142 may be connected to the first auxiliary electrode part 144 located at one side and may be spaced apart from the first auxiliary electrode part 144 located at the other side.

In the case in which the first sensor electrode part 142 and the first auxiliary electrode part 144 are connected to each other, as described above, it is possible to reduce resistance due to the area of the first auxiliary electrode part 144.

The thickness T3 of the first sensor electrode part 142 may be less than the thickness T4 of the first auxiliary electrode part 144. For example, the thickness T3 of the first sensor electrode part 142 may be 50 nm to 350 nm (in one example, 100 nm to 150 nm). The reason for this is that it is possible to form a first sensor electrode part 14 having desired resistance within the above range of thickness. The thickness T4 of the first auxiliary electrode part 144 may be 75 nm to 1050 nm (in one example, 150 nm to 450 nm). Alternatively, the ratio of the thickness T3 of the first sensor electrode part 142 to the thickness T4 of the first auxiliary electrode part 144 (T3:T4) may be 1:1.5 to 1:5. The reason for this is that the first sensor electrode 14 is formed using the stepped part S and wet coating without additional patterning, which will be described in more detail when describing the process of manufacturing the first conductive film 10 with reference to FIGS. 6A to 6E. However, the present invention is not limited thereto. The thickness T3 of the first sensor electrode part 142 and the thickness T4 of the first auxiliary electrode part 144 may have various values.

The first over-coating layer 18, which covers the first sensor electrode 14, may be formed so as to cover the first sensor electrode part 142 and the first auxiliary electrode part 144. Similarly to the first sensor electrode 14, the first over-coating layer 18 may not be formed at opposite side surfaces of the stepped part S in the active area AA and at the other side surface of the stepped part S in the non-active area NA, and may be formed at one side surface of the stepped part S in the non-active area NA so as to cover the first sensor electrode 14. The thicknesses of the first over-coating layer 18 on the first sensor electrode part 142 and the first auxiliary electrode part 144 may be equal to or different from each other.

Hereinafter, the method of manufacturing the first conductive film 10 will be described in more detail with reference to FIGS. 6A to 6E. FIGS. 6A to 6E are sectional views schematically showing the process of manufacturing the first conductive film 10. A detailed description of parts that have been described above will be omitted, and parts that have not been described will be described in detail.

Figure 6A:
FIGS. 6A to 6E are sectional views schematically showing a process of manufacturing the first conductive film.

As shown in FIG. 6A, a film portion 122 is prepared.

Figure 6B:
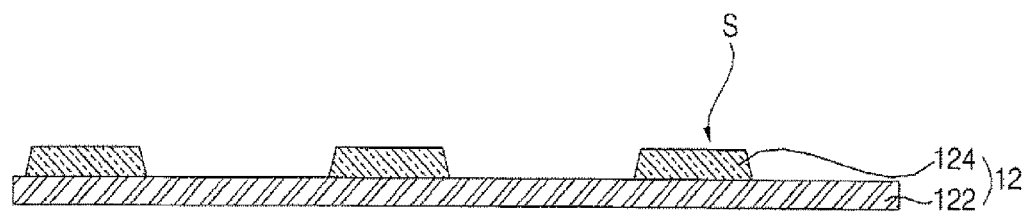

Subsequently, as shown in FIG. 6B, a protruding portion 124 is formed on the film portion 122 to form a first base member 12 having a stepped part S. An unhardened resin layer may be coated on the film portion 122 using various well-known methods, such as photogravure, and the resin layer may be hardened to form a protruding portion 124, thereby forming a stepped part S.

Figure 6C:
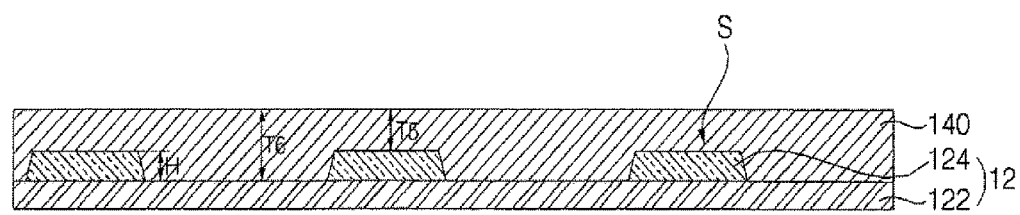

Subsequently, as shown in FIG. 6C, a coating layer 140 having conductors 14a made of a nano-material is formed on the film portion 122 and the stepped part S so as to entirely cover them. The coating layer 140 may be formed by applying, over an entirety thereof, paste, ink, a mixture, or a solution in which conductors 14a made of a nano-material, a solvent, and a binder are mixed. At this time, the thickness of the thick portion of the coating layer 140 may be greater than the height T of the stepped part S, with the result that the coating layer 140 may located above the stepped part S while entirely covering the stepped part S. That is, the coating layer 140 has a fifth thickness T5 on the stepped part S, and has a sixth thickness T6, which is equivalent to the sum of the fifth thickness T5 and the height H of the stepped part S, at the portion at which the stepped part S is not located. The surface of the coating layer 140 may be flat irrespective of the crooked shape due to the stepped part S.

Figure 6D:
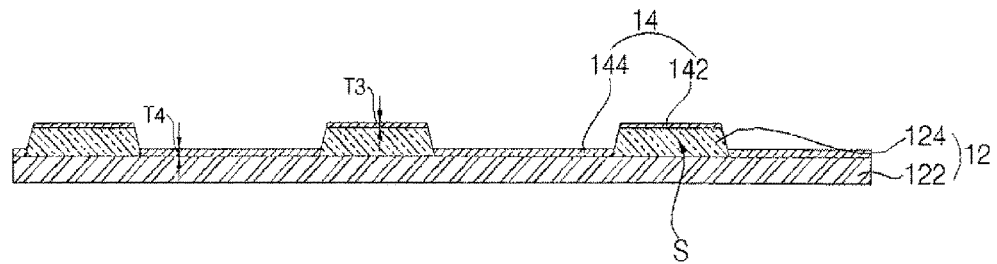

Subsequently, as shown in FIG. 6D, the coating layer 140 (see FIG. 6C; the same in the following) is dried to form a first sensor electrode part 142 located on the stepped part S and a first auxiliary electrode part 144 located on the portion at which the stepped part S is not formed. As previously described, the concentration of the conductors 14a made of the nano-material in the paste, the ink, the mixture, or the solution, in which the conductors 14a made of the nano-material are included, may be, for example, 1% or less. After drying, therefore, the first sensor electrode part 142 and the first auxiliary electrode part 144 have thicknesses equivalent to about 1/100 of the fifth thickness T5 (see FIG. 6C; the same in the following) and the sixth thickness T6 (see FIG. 6C; the same in the following), respectively.

Consequently, the third thickness T3 of the first sensor electrode part 142, formed by drying the coating layer 140 formed on the stepped part S while having the fifth thickness T5, may become less than the fifth thickness T5. For example, the third thickness T3 of the first sensor electrode part 142 may be 50 nm to 350 nm (in one example, 100 nm to 150 nm).

In addition, the fourth thickness T4 of the first auxiliary electrode part 144, formed by drying the coating layer 140 formed on the portion other than the stepped part S while having the sixth thickness T6, may be less than the sixth thickness T6 and greater than the third thickness T3. For example, the fourth thickness T4 of the first auxiliary electrode part 144 may be 75 nm to 1050 nm (in one example, 150 nm to 450 nm).

Since the coating layer is formed at the side surface of the stepped part S having the first angle so as to have a very small thickness due to a high angle of inclination, a first sensor electrode 14 may not be substantially located at the side surface of the stepped part S after drying. Since the coating layer is applied to the side surface of the stepped part S having the second angle so as to have a uniform thickness due to a relatively low angle of inclination, however, a portion of the first sensor electrode 14 may remain at the portion (i.e. where first wire connection parts 142c are located), whereby the first sensor electrode part 142 and the first auxiliary electrode part 144 may be connected to each other.

In this embodiment, as described above, it is possible to form a first sensor electrode 14 having a pattern through the stepped part S without performing an additional patterning process, such as lithography or etching.

Figure 6E:
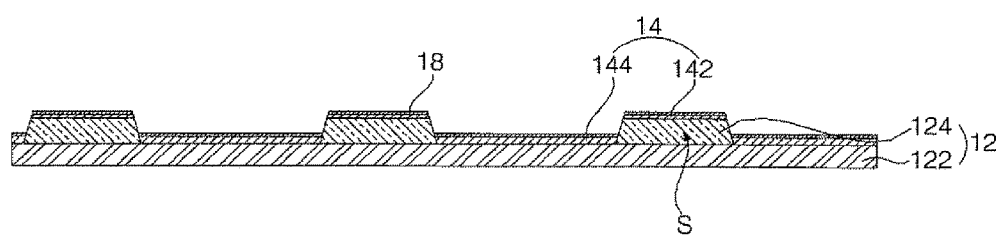

Subsequently, as shown in FIG. 6E, a first over-coating layer 18 is formed on the first base member 12, on which the first sensor electrode 14 is formed. The first over-coating layer 18 may be formed by applying and drying a resin for forming the first over-coating layer 18.

Subsequently, conductive paste for forming a first wire electrode 16 is applied in the form of the first wire electrode 16 and is dried and/or plasticized to form the first wire electrode 16. In FIG. 1, the first wire electrode 16 is shown as being connected to the first wire connection parts 142c. In FIG. 3, the first wire electrode 16 is shown as being located on the first auxiliary electrode part 144 connected to the first sensor electrode part 142 via the first wire connection parts 142c. However, the present invention is not limited thereto. The first wire electrode 16 and the first sensor electrode 14 may be connected to each other in various manners.

Referring back to FIGS. 1 and 2, the second conductive film 20 includes a second base member 22, a second sensor electrode 24 formed on the second base member 22, a second over-coating layer 28 for covering the second sensor electrode 24, and a second wire electrode 26 formed on the second over-coating layer 28 and electrically connected to the second sensor electrode 24 in the non-active area NA.

The second base member 22 may include a stepped part S configured as a concave portion or a protruding portion and having a pattern corresponding to a pattern for touch sensing in the active area AA. In the figure and the description, the stepped part S, on which the second sensor electrode part 242 is located, is configured as a protruding portion. Alternatively, the stepped part S may be configured as a concave portion.

The second sensor electrode 24 may include a second sensor electrode part 242 formed on the stepped part S so as to correspond to the stepped part S in the active area AA. A second auxiliary electrode part (a portion corresponding to reference numeral 144 of FIG. 3) stepped from the first sensor electrode 14 and partially connected (electrically and physically connected) to the second sensor electrode part 242 may be located at the portion other than the stepped part S in the active area AA.

The description of the stepped part S, the first sensor electrode part 142, and the second auxiliary electrode part 144 may equally apply to the stepped part S, the second sensor electrode part, and the second auxiliary electrode part except for the direction in which the second sensor electrode 24 extends and the position of the second wire electrode 26 in a plane.

The second sensor electrode 24, which is formed on the second base member 22, may include second sensor parts 242a located in the active area AA and second connection parts 242b for interconnecting neighboring second sensor parts 242a. In addition, the second sensor electrode 24 may include first wire connection parts 142c extending from the second sensor parts 242a or the second connection parts 242b in the active area AA and located in the non-active area NA. The second over-coating layer 28 is formed so as to cover the second sensor electrode 24, and the second wire electrode 26 is formed on the second over-coating layer 28 so as to be electrically connected to a second wire connection part 246 in the non-active area NA.

The second sensor parts 242a are located so as to correspond to the portion at which the first sensor parts 142a are not located, and the second connection parts 242b extend in a second direction, in which the second sensor parts 242a intersect the first sensor electrode 14 (the vertical direction in the figure). In the figure, the second wire electrode 26 is located under the second sensor electrode 24 to form a single routing structure. Consequently, the second wire electrode 26 is formed in the non-active area NA located on the lower side of the active area AA. However, the present invention is not limited thereto. The second wire electrode 26 may be located on at least one selected from among the upper side, the lower side, the left side, and the right side of the active area AA, and various other changes are possible.

The description of the first conductive film 10 may equally apply to the second conductive film 20, except for the direction in which the second sensor electrode 24 extends and the position of the second wire electrode 26 in a plane. That is, the description of the first base member 12 may equally apply to the second base member 22, and the description of the first sensor electrode 14 may equally apply to the second sensor electrode 24. The description of the first over-coating layer 18 may equally apply to the second over-coating layer 28. The description of the first wire electrode 16 may equally apply to the second wire electrode 26. In addition, the description of the method of manufacturing the first conductive film 10 may equally apply to the method of manufacturing the second conductive film 20.

The second flexible printed circuit board 29 for connection with the outside may be connected to the second wire electrode 26. The description of the first flexible printed circuit board 19 may equally apply to the second flexible printed circuit board 29, and therefore a detailed description of the second flexible printed circuit board 29 will be omitted.

For clear and simple description in the figure and the detailed description, the first conductive film 10 is shown and described as including the first base member 12, the first sensor electrode 14, the first over-coating layer 18, and the first wire electrode 16, and the second conductive film 20 is shown and described as including the second base member 22, the second sensor electrode 242, the second over-coating layer 28, and the second wire electrode 244. However, the present invention is not limited thereto. Consequently, a hard-coating layer for protecting the first and second conductive films 10 and 20, an adhesive layer for improving the adhesive properties of stacked layers, or a primer layer may be further included. The first and second conductive films 10 and 20 may have various structures.

The first conductive film 10 and the second conductive film 20 may be bonded to the cover substrate 30 using the first and second transparent adhesive layers 42 and 44 to manufacture the touch panel 100.

In the touch panel 100 having the above structure, when an input device, such as a finger, contacts the first and second sensor electrodes 14 and 24, a difference in capacitance is generated at the portion that the input device has contacted, and the portion at which the difference is generated may be detected as a touched position.

In the touch panel 100 according to this embodiment or the conductive films 10 and 20 used therein, each of the sensor electrodes 14 and 24 includes conductors 14a made of a nano-material, thereby improving various properties. In addition, the sensor electrodes 14 and 24 are covered by the over-coating layers 18 and 28 to prevent physical damage to or oxidization of the sensor electrodes 14 and 24, thereby improving the properties of the sensor electrodes 14 and 24. The sensor electrodes 14 and 24 are formed through the stepped part S without an additional patterning process, thereby simplifying the manufacturing process and thus greatly improving productivity.

In the above figures and the description, the stepped part S is configured as a protruding portion 124, and the electrode part located on the stepped part S is used as the first sensor electrode part 142. However, the present invention is not limited thereto. The stepped part S may be configured as a concave portion, rather than the protruding portion 124, such that the electrode part located in the concave portion (i.e. the electrode part corresponding to the first connection electrode part 144 in the above embodiment) is used as the first sensor electrode part 142. Additionally, in the above embodiment, the two electrode parts, which are spaced apart from each other, are connected to each other via the stepped part S.

Alternatively, the two electrode parts may not be connected to each other. This change may also apply to the second conductive film 20.

Hereinafter, a touch panel according to another embodiment of the present invention and a conductive film thereof will be described in detail. A description of the elements of this embodiment that are identical or similar to those of the previous embodiment will be omitted, and only the elements of this embodiment that are different from those of the previous embodiment will be described in detail. The above embodiment and modifications thereof and the following embodiments and modifications thereof may be coupled to each other in various manners.

Figure 7:
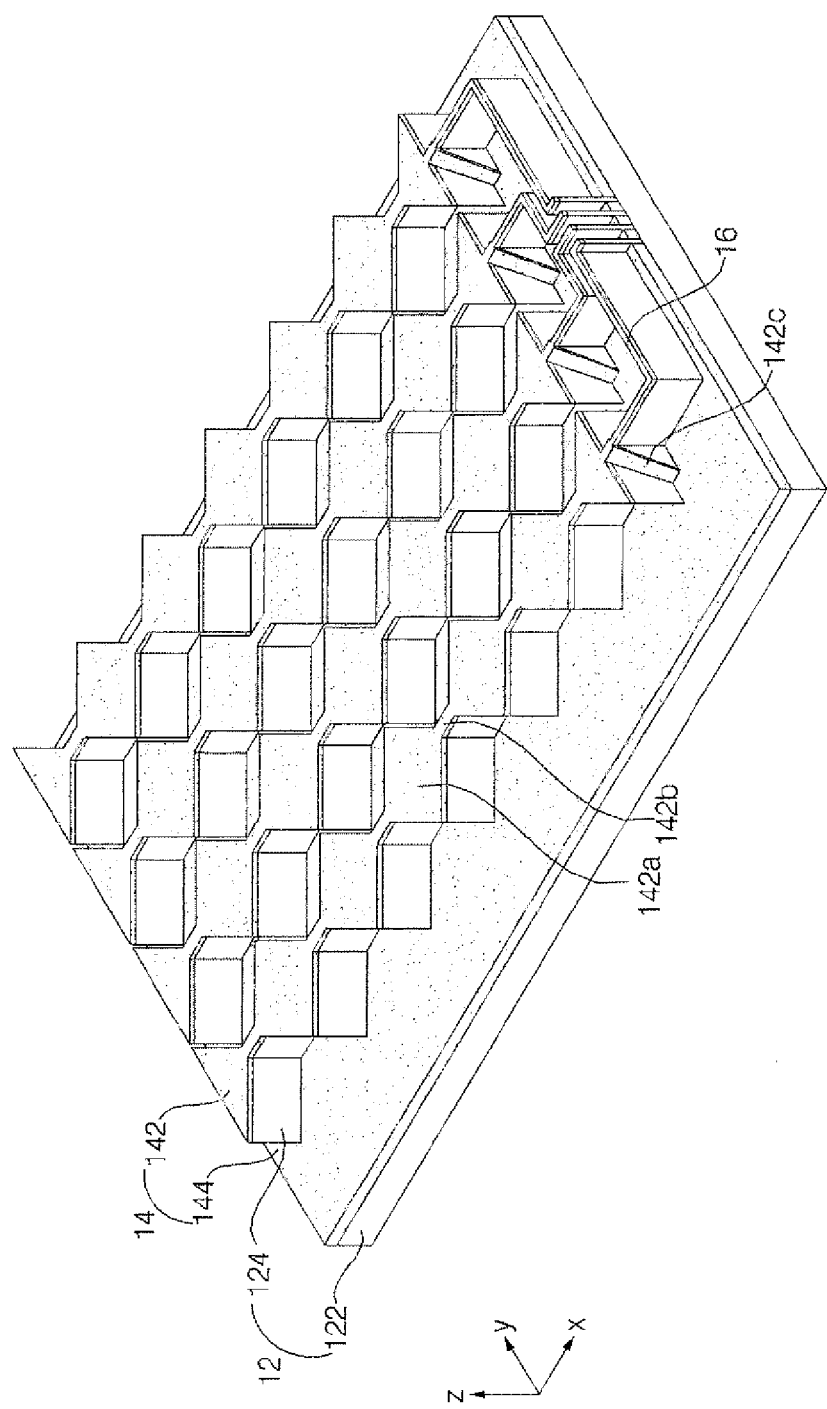
FIG. 7 is a perspective view showing a portion of a first conductive film that is applied to a touch panel according to another embodiment of the present invention.

FIG. 7 is a perspective view showing a portion of a first conductive film that is applied to a touch panel according to another embodiment of the present invention. In FIG. 7, a first base member including a stepped part, a first sensor electrode, and a first wire electrode, which correspond to the elements shown in FIG. 3, are mainly shown.

Referring to FIG. 7, in this embodiment, a stepped part S may also be formed in a non-active area NA. In the non-active area NA, the stepped part S may have a pattern corresponding to a wire pattern. In addition, a first wire electrode 16 may be located on the stepped part S corresponding to the non-active area NA. The first wire electrode 16 may include a first sensor electrode 14 (more specifically, a single layer formed of the same material as a first sensor electrode part 142). When the first sensor electrode 14 is formed, therefore, the first wire electrode 16 may also be formed together with conductors 14a made of a nano-material forming a network structure, whereby it is possible to omit the process of separately forming the first wire electrode 16 or the process of separately patterning the first wire electrode 16. Consequently, it is possible to further simplify the process of manufacturing the first conductive film 10.

In FIG. 7, the first conductive film is shown by way of example. However, the present invention is not limited thereto. The same may also apply a second conductive film.

Figure 8:
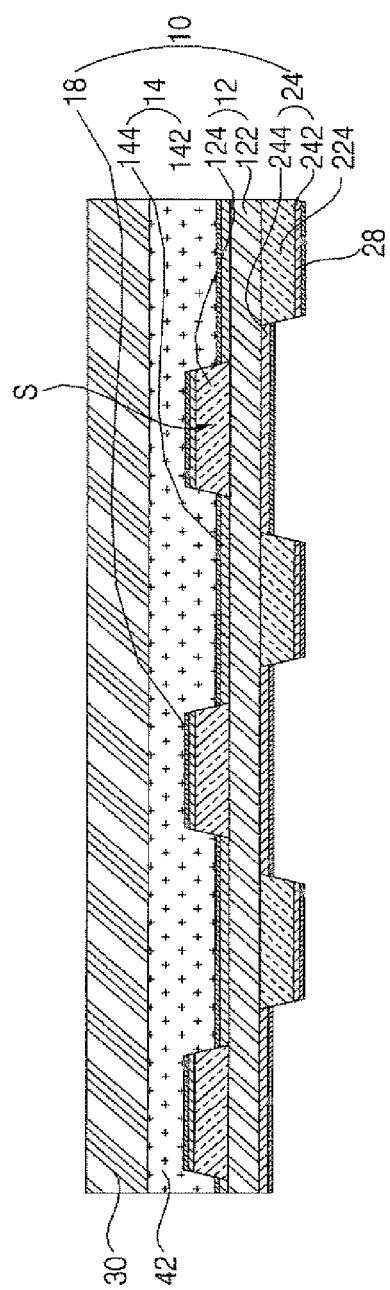
FIG. 8 is a sectional view showing a touch panel according to another embodiment of the present invention.

FIG. 8 is a sectional view showing a touch panel according to another embodiment of the present invention.

Referring to FIG. 8, the touch panel according to this embodiment includes a cover substrate 30, a first transparent adhesive layer 42 located on the cover substrate 10, and a first conductive film 10 located on the first transparent adhesive layer 42. A first sensor electrode 14, a first over-coating layer 18, and a first wire electrode 16 are formed on one surface of the first conductive film 10, and a second sensor electrode 24, a first over-coating layer 28, and a second wire electrode 26 (see FIG. 1) are formed on the other surface of the first conductive film 10. A first protruding portion 124 may be located on one surface of a film portion 122 to constitute a stepped part S, and a second protruding portion 224 may be located on the other surface of a film portion 122 to constitute another stepped part S.

That is, in this embodiment, the first and second sensor electrodes 14 and 24, which are two electrodes included in the touch panel, are located on different surfaces of a first base member 12, and the first and second wire electrodes 16 and 26, which are connected respectively to the first and second sensor electrodes 14 and 24, are located on different surfaces of the first base member 12. In this structure, therefore, the structure of the touch panel may be simplified. In addition, the number of base members having the largest thickness may be reduced, whereby it is possible to reduce the thickness of the touch panel.

Figure 9:
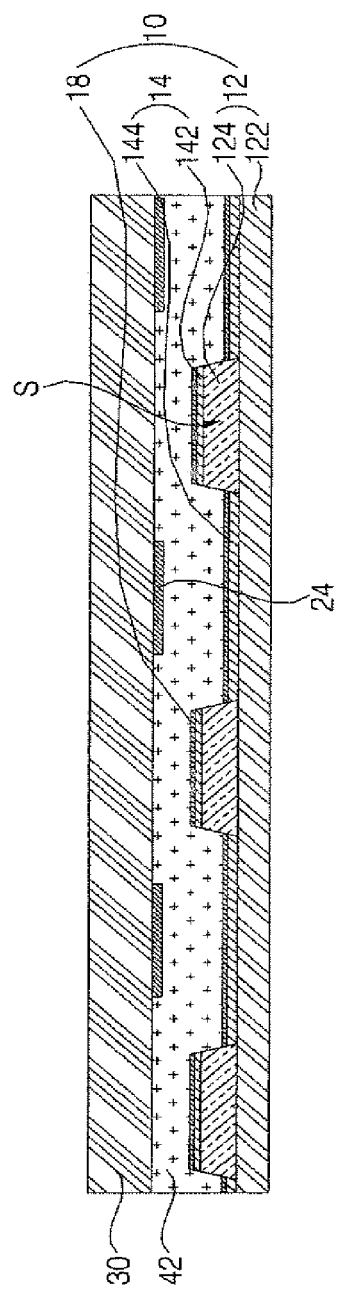
FIG. 9 is a sectional view showing a touch panel according to another embodiment of the present invention.

FIG. 9 is a sectional view showing a touch panel according to another embodiment of the present invention.

Referring to FIG. 9, the touch panel according to this embodiment includes a cover substrate 30, on which a second sensor electrode 24, a second over-coating layer 28, and a second wire electrode 26 (see FIG. 1) are formed, a first transparent adhesive layer 42 located on the cover substrate 30 for covering the second sensor electrode 24, and a first conductive film 10 located on the first transparent adhesive layer 42. A first sensor electrode 14, a first over-coating layer 18, and a first wire electrode 16 are formed on the first conductive film 10. According to this embodiment, the second sensor electrode 24 and the like are formed on the cover substrate 10, whereby it is possible to simplify the structure of the touch panel and to minimize the thickness of the touch panel.

The second sensor electrode 24 may include the same material as the first sensor electrode 14 or a different material than the first sensor electrode 14. In one example, in the case in which the second sensor electrode 24 is made of indium tin oxide, the second sensor electrode 24 may be easily formed on the cover substrate 30. In the case in which the second sensor electrode 24 is made of indium tin oxide, the first over-coating layer 28 may be omitted. The difference in resistance between the first sensor electrode 14 and the second sensor electrode 24 due to the difference of material therebetween may be made uniform by adjusting the thicknesses of the first sensor electrode 14 and the second sensor electrode 24. Alternatively, in the case in which the horizontal length of the touch panel is different from the vertical length of the touch panel, the first sensor electrode 14, which has relatively low resistance, may be configured as a major-axis electrode, and the second sensor electrode 24, which has relatively high resistance, may be configured as a minor-axis electrode. Various other changes are also possible.

Figure 10:
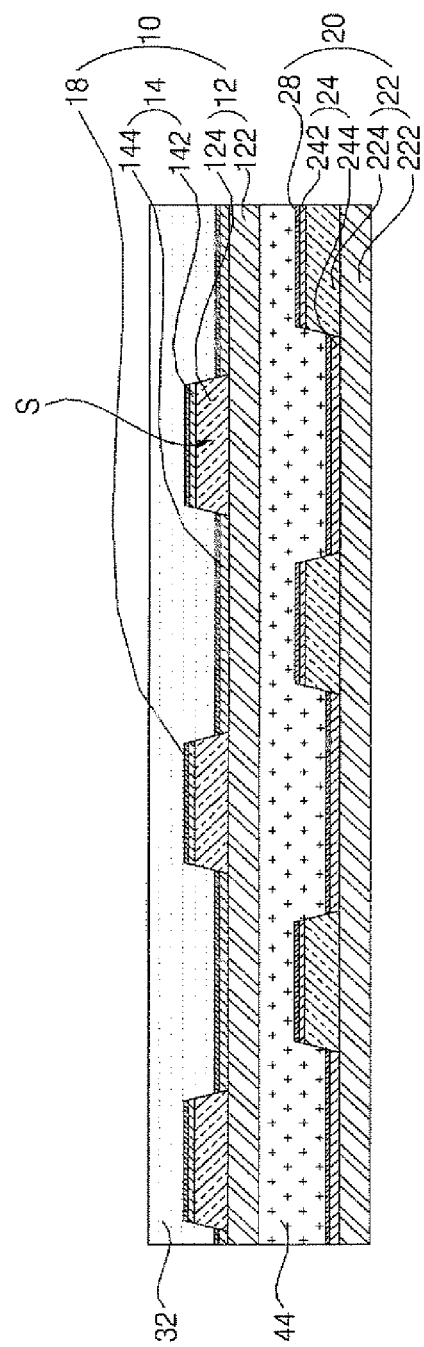
FIG. 10 is a sectional view showing a touch panel according to a further embodiment of the present invention.

FIG. 10 is a sectional view showing a touch panel according to a further embodiment of the present invention.

Referring to FIG. 10, in this embodiment, a cover substrate 30 and a first transparent adhesive layer 42 may not be provided, and a hard-coating layer 32 located on the entire surface of a first conductive film 10 may be included. The hard-coating layer 32 may be made of an acrylic resin. It is possible to reduce cost and to greatly reduce the thickness of the touch panel by removing the cover substrate 30 and the first transparent adhesive layer 42.

The touch panel 100 may be applied to various electronic devices, particularly a display device, such that the display device can be operated by a touch. For example, the touch panel 100 may be applied to a television, which has a main function of displaying images, to the screen of a mobile phone, a tablet PC, a laptop computer, or a watch, which performs an image display function and other functions, or to the display screen of an electric home appliance, such as a refrigerator, a washer, or a water purifier, the performance of which is improved when an image display function is included although the image display function is not the main function thereof. Consequently, it is possible to improve the convenience in operation of the display device.

Hereinafter, an example of a display device 200 to which the touch panel 100 according to one of the various embodiments of the present invention is applicable will be described with reference to FIG. 11. The display device 200 is shown and described by way of example in FIG. 11, and therefore the present invention is not limited thereto. For a simple and clear illustration, elements that are not directly related to the present invention are omitted from FIG. 11 such that the display device 200 is schematically shown.

Figure 11:
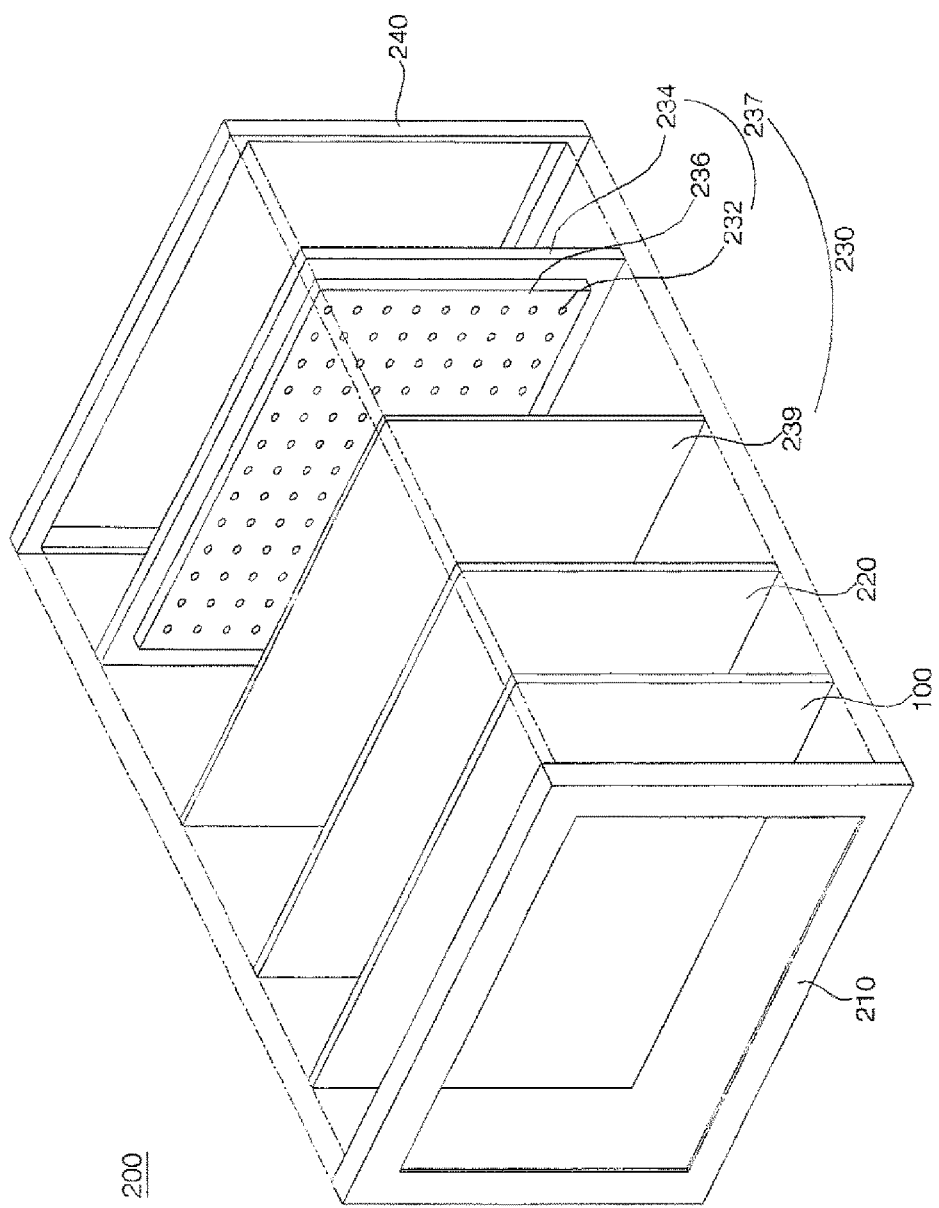
FIG. 11 is a perspective view schematically showing a display device according to an embodiment of the present invention.

FIG. 11 is a perspective view schematically showing a display device according to an embodiment of the present invention.

Referring to FIG. 11, the display device 200 may include a frame 210, a touch panel 100, a display panel 220, a backlight unit 230, and a rear cover 240.

The frame 210 and the rear cover 240 may serve to receive and stably fix the touch panel 100, the display panel 220, and the backlight unit 230, which are located therebetween. In this embodiment, the frame 210 and the rear cover 240 are provided in order to receive and fix the touch panel 100, the display panel 220, and the backlight unit 230. However, the present invention is not limited thereto. Instead of the frame 210 and the rear cover 240, various well-known structures may be used to receive and fix the touch panel 100, the display panel 220, and the backlight unit 230. In particular, the structure of fixing the touch panel 200, the display panel 220, and the backlight unit 230 may be variously modified depending on the application of the touch panel 100. The touch panel including the conductive film described with reference to FIGS. 1 to 10 may be used as the touch panel 100.

Various well-known display panels may be used as the display panel 220 located behind the touch panel 100 for displaying images. In this embodiment, the display panel 220 is a liquid crystal display panel. Since the liquid crystal display panel is not a self emission panel, the backlight unit 230 is provided to provide light to the display panel 220.

The backlight unit 230 may include a light emitting part 237 including a light emitting device 232 for providing light and a diffusion part 239 for uniformly diffusing the light provided by the light emitting device 237.

In this embodiment, the light emitting part 237 is configured to have a direct type structure, in which a plurality of light emitting devices 232 is distributed in a plane. The direct type light emitting part 237 may include a plurality of light emitting devices 232 for providing light, a circuit board 234, to which the light emitting devices 232 are fixed, and a reflection plate 236 having holes, through which the light emitting devices 232 are inserted. However, the present invention is not limited thereto. For example, the light emitting part 236 may be configured to have an edge type structure, in which a plurality of light emitting devices 232 is located at the edge thereof. In the edge type structure, a light guide plate for diffusing light may be further included in addition to the light emitting devices 232. Various well-known techniques may be applied to the edge type structure.

Each of the light emitting devices 232 is a dot light source. In one example, each of the light emitting devices 232 may be a light emitting diode (LED). The light emitting diode has a long lifespan, has low power consumption, can be miniaturized, and is environmentally friendly. However, the present invention is not limited thereto. Various light emitting devices 232 that provide light according to various principles or modes may be used. In addition, various other changes are also possible. For example, each of the light emitting devices 232 may be a line light source or a surface light source.

The light emitting devices 232 may be fixed to the circuit board 234 at predetermined intervals. The circuit board 234 has a circuit pattern to provide power necessary for the light emitting devices 232 to emit light. A printed circuit board (PCB) may be used as the circuit board 234. Alternatively, a metal printed circuit board (MPBC) having a metal layer (in one example, an aluminum layer) stacked on the lower surface thereof to dissipate heat generated from the light emitting devices 232 to the outside may be used as the circuit board 234.

Holes are formed in the reflection plate 236, and the reflection plate 236 and the circuit board 234 are fixed in the state in which the light emitting devices 232, which are fixed to the circuit board 234, are inserted through the holes. The reflection plate 236 reflects the light emitted by the light emitting devices 232 to prevent unnecessary loss of light, thereby improving the intensity of radiation. The reflection plate 236 may be made of various materials capable of reflecting light. In one example, the reflection plate 236 may be made of metal.

In this embodiment, the light emitting part 237 is configured to have a structure in which the light emitting devices 232, which are formed at the circuit board 234, are inserted through the holes in the reflection plate 236. However, the present invention is not limited thereto. The light emitting part 237 may have other different structures.

The diffusion part 239, which diffuses the light emitted by the light emitting devices 232 such that the light is uniformly provided to the display panel 220 is located on the light emitting part 237. Various optical films may be used as the diffusion part 239. Various screening patterns, various well-known structures, such as a prism structure, and various modes may be applied to the diffusion part 239.

In the above description, the display panel has been described as a liquid crystal display panel by way of example. However, the present invention is not limited thereto. Various other panels, such as a plasma display panel (PDP) and an organic light emitting diode (OLED) display panel, may be used as the display panel 220. In the case in which the PDP or the OLED is used as the display panel 220, the backlight unit 230 may be omitted, since the PDP or the OLED is a self emission panel.

The display device 200 may further include various elements or constructions in addition to the touch panel 100, the display panel 220, and the backlight unit 230. For example, a protection film or a glass substrate for protecting the touch panel 100 may be further provided between the frame 210 and the touch panel 100, a circuit unit for electrically interconnecting the touch panel 100 and the display panel 200 and driving the display panel 200 may be further provided, or fastening members or adhesive members for interconnecting respective elements may be further provided. Various other changes are also possible.

The display device according to this embodiment may have excellent touch properties, since the touch panel 100 having excellent electrical properties as described above is included.

Although embodiments have been described with reference to a number of illustrative embodiments thereof, it should be understood that numerous other modifications and applications may be devised by those skilled in the art that will fall within the intrinsic aspects of the embodiments. More particularly, various variations and modifications are possible in concrete constituent elements of the embodiments. In addition, it is to be understood that differences relevant to the variations and modifications fall within the spirit and scope of the present disclosure defined in the appended claims.

The invention claimed is:

1. A conductive film for a touch panel comprising:
   a base member comprising a stepped part configured as a concave portion or a protruding portion and having a pattern corresponding to a pattern for touch sensing in an active area; and
   a sensor electrode comprising a sensor electrode part formed on the stepped part so as to correspond to the stepped part in the active area,
   wherein the sensor electrode further comprises an auxiliary electrode part located in an area other than the stepped part so as to be stepped from the sensor electrode part by the stepped part, and
   wherein the sensor electrode part has a smaller thickness than the auxiliary electrode part.

2. The conductive film according to claim 1, wherein a non-active area is defined outside the active area, and
   the sensor electrode part and the auxiliary electrode part are spaced apart from each other on a side surface of the stepped part in the active area.

3. The conductive film according to claim 2, wherein the stepped part has a height of 30 um to 300 um.

4. The conductive film according to claim 2, wherein an angle formed by opposite side surfaces of the stepped part and a bottom surface of the stepped part in the active area is 80 to 110 degrees.

5. The conductive film according to claim 2, wherein the sensor electrode part and the auxiliary electrode part are connected to each other in the non-active area.

6. The conductive film according to claim 5, wherein, in the non-active area, an angle of one side surface of the stepped part is 45 degrees or lower, and an angle of the other side surface of the stepped part is 80 to 110 degrees.

7. The conductive film according to claim 1, wherein
   a non-active area is defined outside the active area,
   the stepped part has a pattern corresponding to a wire pattern in the non-active area, and
   a wire electrode is formed on the stepped part in the non-active area so as to correspond to the wire pattern.

8. The conductive film according to claim 1, wherein
   the stepped part is configured as the protruding portion, and
   the sensor electrode is located on the protruding portion.

9. The conductive film according to claim 1, wherein the sensor electrode comprises a conductor made of a nanomaterial forming a network structure.

10. The conductive film according to claim 1, wherein the sensor electrode part has a thickness of 50 nm to 350 nm.

11. The conductive film according to claim 1, wherein a ratio of the thickness of the sensor electrode part to the thickness of the auxiliary electrode part is 1:1.5 to 1:5.

12. The conductive film according to claim 1, further comprising an over-coating layer for covering the sensor electrode.

13. A touch panel comprising:
    a conductive film for a touch panel according to claim 1; and
    another sensor electrode formed in a direction in which the another sensor electrode intersects the sensor electrode of the conductive film while being spaced apart from the sensor electrode of the conductive film.

14. A display device comprising:
    a touch panel according to claim 13; and
    a display panel located behind the touch panel for displaying images.

15. A method of manufacturing a conductive film for a touch panel, the method comprising:
    forming a coating layer made of a conductive material over an entirety of a base member comprising a stepped part configured as a concave portion or a protruding portion and having a pattern corresponding to a pattern for touch sensing in an active area; and forming a sensor electrode part located on the stepped part by drying the coating layer so as to be spaced apart from a remaining portion in the active area to form a sensor electrode, wherein the step of forming the sensor electrode comprises forming an auxiliary electrode part located in a portion other than the stepped part so as to be spaced apart from the sensor electrode part by the stepped part in the active area, and wherein the sensor electrode part has a smaller thickness than the auxiliary electrode part.

16. The method according to claim 15, wherein
the stepped part is configured as a protruding portion, and
the sensor electrode is located on the protruding portion.

17. The method according to claim 15, wherein the sensor electrode comprises a conductor made of a nano-material forming a network structure.

\* \* \* \* \*